W. D. FAIDLEY, Jr., J. W. MORRIS & S. A. PATTERSON.
MACHINE FOR REMOVING AND REPLACING METAL PARTS OF TRAIN PIPE COUPLINGS.
APPLICATION FILED JULY 25, 1917.
1,252,677.
Patented Jan. 8, 1918.
2 SHEETS—SHEET 1.
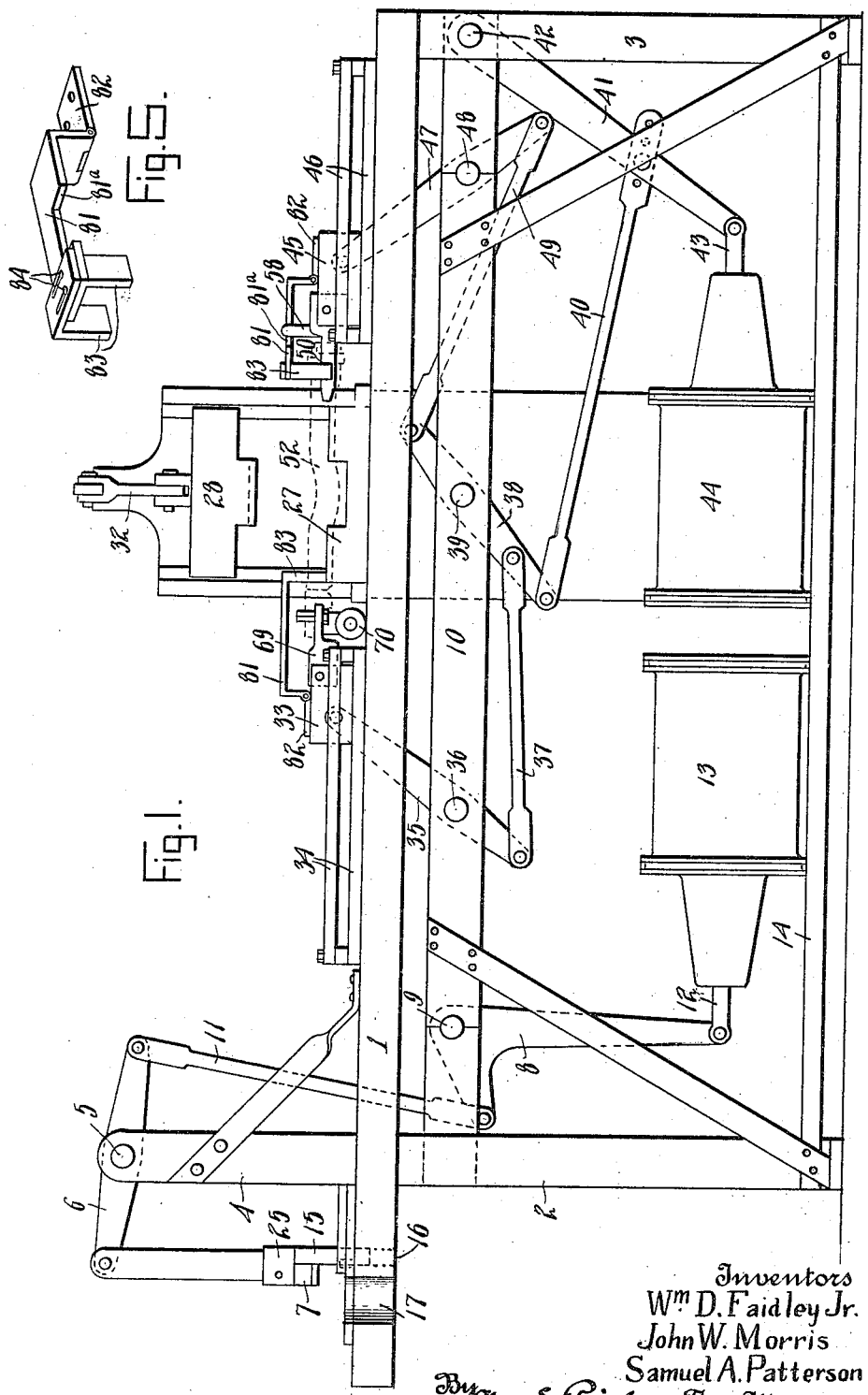

W. D. FAIDLEY, Jr., J. W. MORRIS & S. A. PATTERSON.
MACHINE FOR REMOVING AND REPLACING METAL PARTS OF TRAIN PIPE COUPLINGS.
APPLICATION FILED JULY 25, 1917.
1,252,677.
Patented Jan. 8, 1918.
2 SHEETS—SHEET 2.
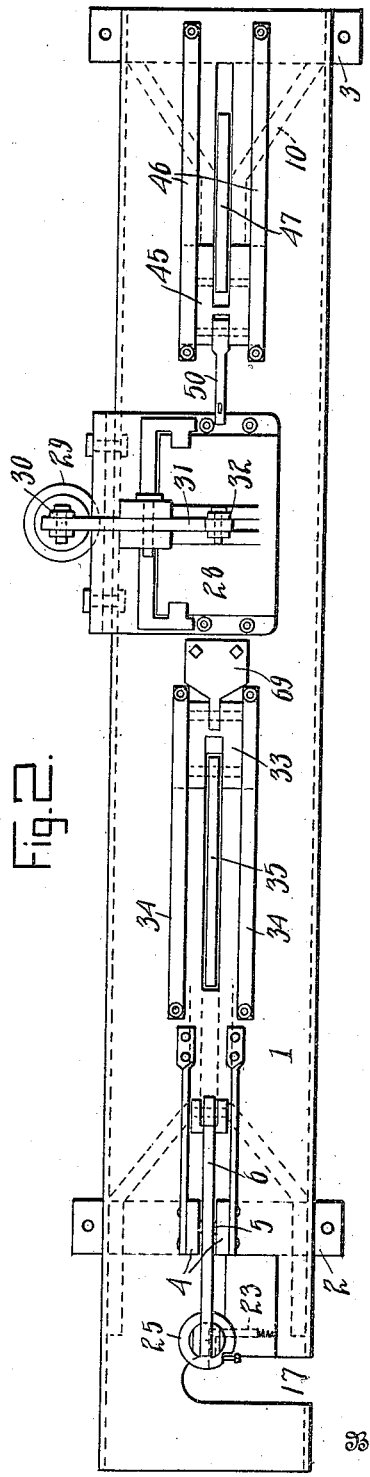
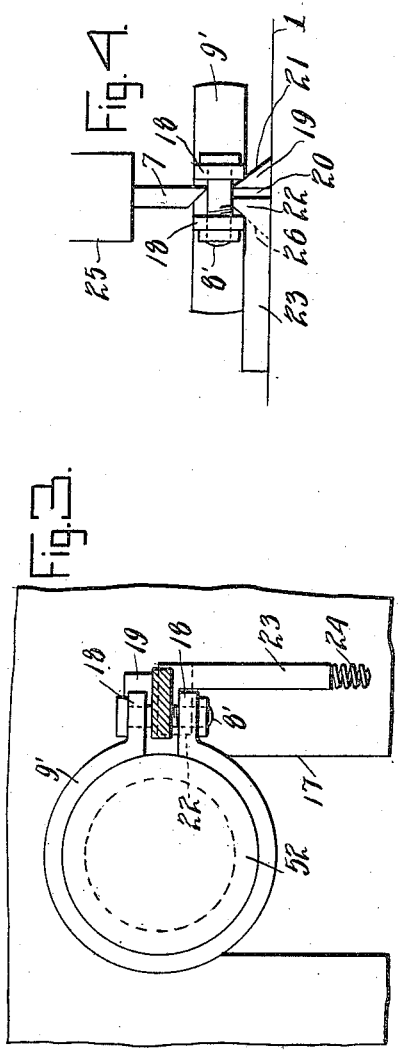
Inventors
Wm D. Faidley Jr.
John W. Morris
Samuel A. Patterson
By Chas. E. Riordan
Their Attorney

UNITED STATES PATENT OFFICE.

WILLIAM D. FAIDLEY, JR., OF CLIFTON FORGE, JOHN W. MORRIS, OF IRON GATE, AND SAMUEL A. PATTERSON, OF CLIFTON FORGE, VIRGINIA.

MACHINE FOR REMOVING AND REPLACING METAL PARTS OF TRAIN-PIPE COUPLINGS.

1,252,677.	Specification of Letters Patent.	Patented Jan. 8, 1918.

Original application filed October 23, 1916, Serial No. 127,151. Divided and this application filed July 25, 1917. Serial No. 182,752.

*To all whom it may concern:*

Be it known that we, WILLIAM D. FAIDLEY, Jr., residing at Clifton Forge, Alleghany county, Virginia, JOHN W. MORRIS, residing at Iron Gate, Alleghany county, Virginia, and SAMUEL A. PATTERSON, residing at Clifton Forge, Alleghany county, Virginia, citizens of the United States, have invented certain new and useful Improvements in Machines for Removing and Replacing Metal Parts of Train-Pipe Couplings, of which the following is a specification.

This invention relates to mechanism for detaching the metal parts of worn out train pipe couplings, especially the coupling heads, nipples and clamping bands carried by the opposite ends of the hose sections comprising such train pipe or air brake couplings, and for applying such metal parts to new hose sections. Heretofore when a hose section has become so worn as to be of no further use, the whole coupling has been discarded, although the metal coupling head, nipple and clamping bands are by no means unfit for further service. It is the aim of this invention to provide a machine for removing such metal parts from the old hose sections and for attaching them to new hose sections so that they may be again utilized, and the present invention is the provision of means principally for the removal of the clamping bands or rings from the worn out couplings or hose sections in such manner that said clamps or rings are preserved and may be used on the new couplings and great expense thereby saved both in labor and material.

The coupling head and nipple are fastened to the opposite ends of the hose section by clamping bands or rings having spaced outwardly turned flanges at their ends secured together by bolts bridging the space between said flanges. These clamping bands or rings must be removed before the coupling head and nipple can be separated from the end portions of the hose section, and the machine embodying the invention is equipped with means for doing this as the first step in the removal of the metal parts of the coupling. Means are also provided for holding the hose section while the coupling head and nipple are either withdrawn therefrom or applied thereto, and also for the complete removal of the clamping bands.

The invention will be first hereinafter described in connection with the accompanying drawings, which constitute part of this specification, and then more specifically defined at the end of the description, the present application being a division of our application filed October 23, 1916, Ser. No. 127151.

In the accompanying drawings, wherein similar reference characters are used to designate corresponding parts throughout the several views:

Figure 1 is a side elevation of a machine constructed substantially in accordance with one form of the present invention, Fig. 2 is a plan view of the same, Fig. 3 is a detailed plan view of the means for cutting the bolts which hold the clamping band on the coupling, Fig. 4 is a side view of the same, and Fig. 5 is a detail perspective view of one form of tool for removing the loosened or spread clamping bands from the hose sections.

A table 1, which carries certain parts of the machine is mounted upon suitable supports 2 and 3 at opposite ends thereof, the supports 2 at one end extending up through the table, as at 4, and supporting the pivot 5 of a lever 6 for operating the reciprocating knife 7 which is used for cutting the bolts 8' holding the clamping bands 9' around the hose sections. Said lever 6 is operated by a bell-crank lever 8 pivoted at 9 between a pair of longitudinal bars 10 arranged below the table 1, one end of said bell crank lever being connected to the lever 6 by a pitman 11 while the other end of said lever 8 is connected to the piston rod 12 of a compressed air cylinder 13 located on a platform 14 at the base of the table. Any suitable means (not shown) may be employed for controlling the reciprocating movement of the piston rod 12 for moving the knife 7 through the instrumentality of the bell crank lever 8, pitman 11 and lever 6.

At one end of the knife 7 there is a depending guide 15 working in a slot 16 in the table. Another slot 17 enters from one side of the table and terminates adjacent the knife, and into this slot 17 the hose 52 is introduced, as shown in Fig. 3, when the bolt 8' is to be cut. When the hose is in position in the slot 17 as shown in this figure, the clamping band 9′ is arranged above the top surface of the table and the middle portion of the bolt is disposed below the knife, so that when said knife descends it will cut through said middle portion of the bolt thus releasing the end portions or flanges 18 of the clamping band from one another.

During the cutting operation the bolt 8′ is supported upon a beveled lug 19 projecting above the top surface of the table 1 and having a vertical face 20 arranged substantially in vertical alinement with the flat side of the knife 7. The opposite face of the lug 19 is inclined as at 21, Fig. 6. The bolt 8′ also rests upon a beveled laterally extending lug 22 on a sliding member 23 fitted in a recess in the table 1 and normally held in the position shown in Figs. 3 and 4 by a spring 24. When the knife descends its beveled edge, after passing through the bolt 8′, enters between the lugs 19 and 22 and forces the sliding member 23 away from the fixed lug 21, thereby spreading the flanges 18 on the clamping ring 9′ to some extent. As the knife completes its downward stroke the head 25 comes in contact with the flanges 18 and forces them still farther apart as they are moved down along the inclined face 21 of the lug 19 and the correspondingly inclined opposite face 26 of the lug 22. After this operation the clamping band 9′ will be loose enough to be readily removed when the coupling head and nipples are taken off by the mechanism described and claimed in our application before mentioned, Ser. No. 127151. After being removed the clamping band is in condition to be used again for holding a nipple or coupling head on a new hose section.

One form of mechanism for entirely removing the clamping band or ring from the hose section, as well as removing the coupling heads and nipples is fully described and claimed in said application Ser. No. 127151, and so far as the mechanism for removing the coupling heads and nipples is concerned forms no part of the present application.

After the bolt has been severed and the clamping bands or rings partially opened or spread as above set forth, said hose section is then placed across the stationary jaw 27 of a holding clamp arranged on the table 1, and the supplemental movable member 28 of said clamp is forced down upon it by means of compressed air apparatus including a cylinder 29 supported on the back of the machine, a piston rod 30 working in said cylinder, an intermediately pivoted lever 31 connected at one end to said piston rod, and a link 32 connected to the other end of the lever 31 and to the movable jaw 28. It will be understood that any suitable means (not shown) may be employed for controlling this compressed air apparatus.

At one side of the clamping jaws 27 and 28 a sliding block 33 is mounted on guides 34 to be moved toward and away from said clamping jaws. The movement of said block 33 is effected by a lever 35 pivoted at 36 between the bars 10, a link 37 connected at one end to the lever 35, another lever 38 pivoted at 39 between the bars 10 and connected to the other end of the link 37, another link 40 connected at one end to the lever 38, another lever 41 pivoted at 42 between the bars 10 and connected to the other end of the link 40, and a piston rod 43 working in a compressed air cylinder 44 and connected to the lever 41, as clearly illustrated in Fig. 1.

At the other side of the clamping jaws 27 and 28 a block 45 is mounted to slide on guides 46 toward and away from said jaws, and said block 45 is reciprocated by means of a lever 47 pivoted at 48 between the bars 10, and a link 49 connected at one end to the lever 47 and at the other end to the lever 38. From the arrangement of levers shown and described, it will be seen that the outward movement of the piston rod 43 will cause the blocks 33 and 45 to move in opposite directions away from the clamping jaws 27 and 28, while the reverse movement of the piston rod 43 will advance the blocks 33 and 45 toward said clamping jaws.

The block 45 carries a tool 50 adapted to enter the nipple on the adjacent end of the hose section on the advance movement of said block 45. The specific form of tool is described and claimed in the above mentioned application Serial No. 127151, and inasmuch as it forms no part of the present invention further description thereof is deemed unnecessary.

After the tool 50 is introduced into the end of the hose section past the nipple means are provided for grasping the coupling and nipple and forcibly removing them on the return movement of the tool.

Tools are provided for removing the partially spread clamping rings or bands and one form of such tools is illustrated in Fig. 5. Such a tool is carried by each of the reciprocating blocks 33 and 45.

Each of these tools comprises a leaf 82 fastened to the block, a hinged portion 81 and depending fingers 83 at the free end of said hinged portion. The hinged portion 81 is of angular formation so as to raise it above the tools 50 and 69, and is notched at 81$^a$ to avoid interfering with the hand lever 58. The fingers 83 are designed to embrace the hose section 58. The fingers 83 are designed to embrace the hose section 52 and engage the clamping bands 9′, which have been loosened or spread as already explained, whereby said clamping bands are removed from the hose section simultaneously with the removal of the nipple and coupling head when the blocks 33 and 45 are moved away from each other. The fingers 83 may be adjusted, as suggested at 84, for fitting different sizes of hose sections.

The operation of the machine will be obvious and apparent from the foregoing description and detail statement of such operation is unnecessary. The worn out hose section having been properly placed on the table 1 with the bolt 8' supported upon the beveled lug 19 and the knife with its cooperating mechanism having been operated to sever the bolt and spread the clamping bands or rings slightly said hose section with the clamping bands loosely secured thereto is then placed in the clamp 27 and the tool shown in Fig 5 having been properly located with reference to said clamping bands the clamping bands are removed on the return movement of the blocks 33 and 45 at the same time that the couplings and nipples are removed.

Having thus described our invention what we claim as new and desire to secure by Letters Patent is:

1. In a machine of the character described, the combination with means for supporting the hose section of a train pipe coupling with the clamping band thereon, of means for severing the bolt which holds the ends of said clamping band together, of means for removing the clamping bands from said hose section.

2. In a machine of the character described, the combination with means for supporting the hose section of a train pipe coupling with the clamping band thereon, of means for severing the bolt which holds the ends of said clamping band together, of means for spreading said clamping bands, of means for removing the clamping bands from said hose section.

3. In a machine of the character described, the combination with means for supporting the hose section of a train pipe coupling, with the clamping bands, coupling heads and nipples thereon, of means for severing the bolt which holds the ends of said clamping bands together, of means for removing said clamping bands from the hose section, and means for simultaneously withdrawing the coupling heads and nipples from the hose section.

4. In a machine of the character described, the combination with means for supporting the hose section of a train pipe coupling, with the clamping bands, coupling heads and nipples thereon, of means for severing the bolt which holds the ends of said clamping bands together, of means for spreading said clamping bands, of means for removing said clamping bands from the hose section, and means for simultaneously withdrawing the coupling heads and nipples from the hose section.

5. In a machine of the character described, the combination with a table having a slot to fit around the hose section of a train pipe coupling while the clamping band of such coupling is supported on the table, of a reciprocating knife for cutting the bolt which holds the ends of said band together.

6. In a machine of the character described, the combination with a table, of a fixed lug on the table, a movable lug also mounted on the table, both lugs being adapted to support the bolt which holds the ends of the clamping band of a train pipe coupling together, and a reciprocating knife for cutting said bolt and moving the movable lug away from the fixed lug for spreading apart the ends of the band.

7. In a machine of the character described, the combination with a table, of a lug mounted thereon and having an inclined face, said lug adapted to support the bolt which holds the ends of the clamping band of a train pipe coupling together, the inclined face of said lug engaging one of the spaced ends of said band, a reciprocating knife for cutting said bolt, and means carried by said knife for forcing one of the ends of the band down the inclined face of the lug for spreading apart said ends.

8. In a machine of the character described, the combination with a table, of a fixed lug mounted thereon and having an inclined face, a movable lug also mounted on the table and having an inclined face, both lugs adapted to support the bolt which holds the ends of the clamping band of a train pipe coupling together, the inclined faces of said lugs engaging the spaced ends of said band, a reciprocating knife for cutting said bolt, and means carried by said knife for forcing the ends of the band down the inclined faces of the lugs for spreading apart said ends.

9. In a machine of the character described, the combination with means for supporting the clamping band of a train pipe coupling, of means for severing the bolt which holds the ends of said clamping bands together, and simultaneously spreading the ends of the clamping bands.

WILLIAM D. FAIDLEY, Jr.
JOHN W. MORRIS.
SAMUEL A. PATTERSON.

Copies of this patent may be obtained for five cents each, by addressing the "Commissioner of Patents, Washington, D. C."